United States Patent [19]

Imada et al.

[11] 4,396,641

[45] Aug. 2, 1983

[54] METHOD FOR IMPROVING SURFACE PROPERTIES OF SHAPED ARTICLES OF SYNTHETIC RESINS

[75] Inventors: Kiyoshi Imada, Omiya; Susumu Ueno; Hirokazu Nomura, both of Ibaraki, all of Japan

[73] Assignee: Shin-Etsu Chemical Co., Ltd., Japan

[21] Appl. No.: 299,182

[22] Filed: Sep. 3, 1981

[30] Foreign Application Priority Data

Sep. 8, 1980 [JP] Japan ............................ 55-124348

[51] Int. Cl.³ .............................................. B05D 5/12
[52] U.S. Cl. .................................... 427/41; 204/165; 427/40
[58] Field of Search ................ 427/38, 39, 40, 41; 204/165, 164, 169

[56] References Cited

U.S. PATENT DOCUMENTS 4,096,315 6/1978 Kubacki ............................ 427/38
4,276,138 6/1981 Asai et al. ......................... 204/165

*Primary Examiner*—John H. Newsome
*Attorney, Agent, or Firm*—Toren, McGeady and Stanger

[57] ABSTRACT

The invention provides a novel and efficient method for the improvement of the surface properties of a shaped article of a synthetic resin such as a vinyl chloride-based resin. In particular, the outstanding defective point of the plastic resin articles toward accumulation of static electricity on the surface is greatly reduced by the inventive method, in which the surface of the article is exposed to the low temperature plasma generated in a gaseous atmosphere containing an organic silicon compound followed, preferably, by contacting treatment with a halogen or a halogen compound such as hydrogen halides and halogen-containing organic compounds in a gaseous phase. The organic silicon compound in the gaseous plasma atmosphere is preferably diluted with a diluent gas which may be nitrogen, nitrogen oxides, ammonia or rare gases at a specified partial pressure.

11 Claims, No Drawings

METHOD FOR IMPROVING SURFACE PROPERTIES OF SHAPED ARTICLES OF SYNTHETIC RESINS

BACKGROUND OF THE INVENTION

1. Field of the Invention

The present invention relates to a method for improving surface properties of a shaped article of a synthetic resin or, in particular, of a vinyl chloride-based resin. More particularly, the invention relates to a method for reducing electrostatic charging or accumulation of static electricity on the surface of a shaped article of a vinyl chloride-based resin or other thermoplastic and thermosetting synthetic resins.

As is well known, shaped articles of a vinyl chloride-based resin (hereinafter referred to as PVC resin) or other thermoplastic and thermosetting synthetic resins are remarkably susceptible to the accumulation of static electricity on the surface thereof bringing about several problems of not only the dirtiness of appearance caused by the deposition or clogging of dusts on the surface but also the unpleasant influence to the human body in contact therewith by the electric shock with the static electricity accumulated on the surface and the danger of spark discharge.

Various attempts have been made to find an effective way or method for overcoming the above mentioned disadvantages of shaped articles of a synthetic resin by the improvement of the surface properties leading to the decrease of the electrostatic charge on the surface.

For example, such an anti-static effect is obtained by coating the surface of the article with a surface active agent known to be effective as an anti-static agent. This method is advantageous when the anti-static effect is to be exhibited instantly but is defective in the relatively poor durability of the effect as well as in the sticky touch of the coated surface which eventually leads to blocking of the shaped articles with each other.

2. Description of the Prior Art

Another way to reduce the electrostatic charge on the surface of a shaped article of a synthetic resin is to admix the resin with an anti-static agent, e.g. surface active agent, before the resin is shaped into the shaped article by molding. This method is satisfactory in the durability of the anti-static effect but the effectiveness of the method is impractically low when the amount of the anti-static agent is limited. When the amount of the anti-static agent incorporated into the resin is increased to such an extent that a practically significant anti-static effect is obtained, there may also be caused problems of sticky touch on the surface leading to blocking and readiness of staining in addition to the coloring of the surface as well as the detrimental effect on the heat resistance of the shaped article if not to mention the somewhat adverse effect on the workability of the resin per se admixed with the anti-static agent in such a large amount.

On the other hand, there has been recently proposed a method in which the surface of a shaped article of a synthetic resin, e.g. a PVC resin, can be rendered more hydrophilic when the surface is subjected to exposure to a low temperature plasma of certain kinds of inorganic or organic gases whereby the accumulation of static electricity on the surface can be reduced to some extent. This method is, however, not satisfactory due to the relatively low effectiveness and the poor durability of the effect not to warrant the practical application of the method.

SUMMARY OF THE INVENTION

Thus, an object of the present invention is to provide a novel and improved method for reducing the electrostatic charge on the surface of a shaped article made of a synthetic resin so effective and durable that the above mentioned shortcomings in the prior art methods can be overcome by a very simple means.

The method of the present invention established as a result of the extensive investigations undertaken by the inventors for improving the surface properties of a shaped article made of a synthetic resin comprises treating the surface of the shaped article by the exposure to a low temperature plasma of a gas or vapor of an organic silicon compound having one or more of functional atoms or groups bonded to the silicon atom or atoms.

The pressure of the above mentioned organic silicon compound in the gaseous phase for plasma generation is preferably from $10^{-3}$ to 10 Torr but it is further preferable that the gas or vapor of the organic silicon compound is diluted with nitrogen, a nitrogen-containing inorganic gas or a rare gas at a partial pressure from $10^{-4}$ to 10 Torr.

The effectiveness of the plasma treatment of the shaped article in the plasma atmosphere of the gas or vapor of an organic silicon compound can be further enhanced when the shaped article having been treated with the plasma is contacted with a halogen, hydrogen halide or organic halogen compound.

DETAILED DESCRIPTION OF THE PREFERRED EMBODIMENTS

When the synthetic resin, of which the objective articles are shaped, is a PVC resin, it can be either homopolymeric resins of vinyl chloride or various kinds of copolymeric resins mainly, for example 50% by weight or more, composed of vinyl chloride. The co-monomers copolymerizable with vinyl chloride are well known in the art as exemplified by vinyl esters such as vinyl acetate, acrylic or methacrylic acid and esters thereof, acrylonitrile, vinylidene halides, olefins such as ethylene and propylene and the like. It is of course that not only binary copolymers but also ternary or multi-component copolymers are applicable to the method of the present invention. Graft copolymers based on a PVC resin can also be used.

These PVC resins may be used as a polymer blend of two kinds or more according to need and, in some cases, may be used as blended with other kinds of synthetic resins such as copolymers of ethylene and vinyl acetate, copolymers of styrene and acrylonitrile, copolymers of acrylonitrile and butadiene, copolymers of methyl methacrylate, styrene and butadiene, copolymers of acrylonitrile, styrene and butadiene, polyamide resins, caprolactam resins, epoxy-modified polybutadienes, epoxy-modified polyols, organopolysiloxanes and the like.

The shaped article of the above described PVC resin may be either of a flexible type or of a rigid type according to the presence or absence of a substantial amount of a plasticizer in the formulation of the resin composition to be fabricated. Various kinds of conventional plasticizers can be used when a flexible shaped article of a plasticized PVC resin is to be subjected to the treatment according to the inventive method without particular limitations. The resin composition also can contain other conventional additives used in the fabrication of PVC resins such as stabilizers, heat-resistance improvers, lubricants, fillers, coloring agents, e.g. pigments and dyes, ultraviolet absorbers, anti-oxidants, crosslinking agents, surface active agents and the like without particular limitations.

The method of the present invention is of course applicable to other kinds of synthetic resins than PVC resins including thermoplastic and thermosetting resins such as low- and high-density polyethylenes, polypropylenes, polystyrenes, copolymers of acrylonitrile and styrene, saturated and unsaturated polyester resins, polycarbonate resins, polyamide resins, polyacetones, acrylic and methacrylic resins, polyvinyl alcohols, copolymers of acrylonitrile, styrene and butadiene, polyimide resins, polysulfone resins, polyurethane resins, copolymers of ethylene and vinyl acetate, polyamideimide resins, urea-formamide resins, melamine resins, silicone resins, polyphenyleneoxides, polyacetals, poly-p-xylene resins, epoxy resins, polydiallyl phthalate resins and the like.

The method for the fabrication of the synthetic resin composition into shaped articles is also not limitative including extrusion molding, injection molding, calendering, compression molding and the like depending on the particular resin and the desired form of the shaped articles.

In the method of the present invention, the shaped article of a synthetic resin is first subjected to the treatment with or exposed to a low temperature plasma generated in a specific gaseous atmosphere as defined hereunder. The low temperature plasma is well known in the art as a gaseous atmosphere full of electrically charged or excited species generated by the application of an electric power through a gaseous atmosphere of a reduced pressure of from 0.001 to 10 Torr or, preferably, from 0.01 to 1 Torr. The electric power is usually supplied at a frequency of so-called high frequency range from several kHz to microwave range.

The shapes and arrangement of the electrodes for the plasma generation are not limitative in so far as stable plasma discharge can be insured within the space in which the surface of the shaped article is exposed to the plasma atmosphere. Thus, a pair of inside electrodes, a pair of exterior electrodes and a coiled electrode may be used according to particular types of the apparatus for plasma generation. The electrodes may be connected to the high frequency generator either by capacitive coupling or by inductive coupling.

The time for the plasma treatment is usually from a few seconds to several tens of minutes although the time should be determined depending on the intensity of the plasma and the desired effects on the surface of the shaped article. At any rate, denaturation of the surface of the shaped article by the heat of electric discharge should be avoided.

In the inventive method, the gaseous composition which constitutes the plasma atmosphere is of importance. It has been unexpectedly discovered that best results are obtained when the low temperature plasma is generated in an atmosphere of a specific organic silicon compound at a pressure of from 0.001 to 10 Torr or, preferably, from 0.01 to 5 Torr. Therefore the organic silicon compound must have a vapor pressure to give the above defined pressure in the plasma atmosphere.

It is preferable that the organic silicon compound has at least one functional atom or group in a molecule bonded to the silicon atom directly or through a divalent hydrocarbon group. The functional atom and group directly bonded to the silicon atoms are exemplified by a hydrogen atom, halogen atom, e.g. chlorine and fluorine, hydroxy group, alkoxy group, acyloxy group, alkenyl group, alkynyl group and the like. The functional group bonded to the silicon atom through a divalent hydrocarbon group is exemplified by an amino group, methacryloxy group, mercapto group, epoxy group and the like. The organic silicon compound may be in the form of either an organosilane compound or an organopolysiloxane compound provided that the compound has a sufficiently high vapor pressure as mentioned above. It is more preferable that the organic silicon compound has two or more of the functional atoms or groups above mentioned in a molecule.

The organic silicon compound having no such functional atoms or groups in the molecule is exemplified by tetramethylsilane and hexamethyldisiloxane and the organic silicon compound having one or more of the functional atoms or groups is exemplified by trimethylsilane, diethylsilane, trimethylchlorosilane, methyl trichlorosilane, trimethylsilanol, trimethyl methoxysilane, methyl triethoxysilane, acetoxy trimethylsilane, triacetoxy methylsilane, ethynyl trimethylsilane, 1,3-diethynyl-1,1,3,3-tetramethyldisloxane, trimethyl vinylsilane, 1,3-divinyl-1,1,3,3-tetramethyldisiloxane, dimethyl vinyl chlorosilane, dimethoxy methylsilane, vinyl trimethoxysilane, vinyl methyl dimethoxysilane, vinyl methyl dichlorosilane, phenyl trichlorosilane, methyl dichlorosilane, trimethyl chlorosilane, phenyl trifluorosilane, N-(2-aminoethyl)-3-aminopropyl methyl dimethoxysilane, 3-methacryloxypropyl trimethoxysilane, tetraethoxysilane and the like. These organic silicon compounds may be used either alone or as a combination of two kinds or more according to need.

It has been unexpectedly discovered that better results are obtained when the gas or vapor of the organic silicon compound is diluted with an inert inorganic gas selected from the group consisting of nitrogen, nitrogen oxides, e.g. nitric oxide NO and nitrogen dioxide $NO_2$, ammonia and rare gases, i.e. helium, argon, neon and xenon in the plasma atmosphere. The partial pressure of these diluent gases in the gaseous mixture with the organic silicon compound is preferably from 0.0001 to 10 Torr or, more preferably, from 0.001 to 5 Torr. It should be noted that the total pressure of the gaseous mixture of the organic silicon compound and the diluent gas should not exceed 10 Torr or, preferably, 1 Torr in order not to decrease the stability of the plasma discharge.

It has been further discovered that the effects of the above described plasma treatment in the atmosphere containing the organic silicon compound are further improved when the shaped article of the synthetic resin having been subjected to the plasma treatment is contacted with a halogen, i.e. fluorine, chlorine, bromine or iodine, a hydrogen halide, i.e. hydrogen fluoride, hydrogen chloride, hydrogen bromide or hydrogen iodide, or an organic halogen compound. The organic halogen compound above mentioned is exemplified by 3-fluoro-n-propane, methyl chloride, methyl bromide, allyl chloride, vinyl chloride, vinyl bromide, isopropenyl chloride, 1,1,2-trifluoroethane, 1,1-dichloroethane, chloroform, carbon tetrachloride and the like.

The above mentioned contacting treatment with a halogen or a halogen compound (hereinafter referred to as halogen treatment) may be carried out either in the gaseous phase or in the liquid phase. When the halogen or halogen compound is gaseous at room temperature, the halogen treatment in the gaseous phase can be carried out with the halogen or halogen compound as such while the halogen or halogen compound not gaseous at room temperature must be vaporized or gasified by heating and/or pressure reduction as in the use of bromine, iodine, allyl chloride, chloroform, carbon tetrachloride and the like for the halogen treatment in the gaseous phase. When a halogen treatment in the liquid phase is desired, on the other hand, halogens and halogen compounds in the gaseous form at room temperature must be liquefied by cooling and/or compression such as in the use of fluorine, hydrogen fluoride, chlorine, hydrogen chloride, hydrogen bromide, hydrogen iodide, methyl chloride, vinyl chloride and the like.

The halogen treatment is preferably carried out in a gaseous phase in consideration of the simplicity of the contacting operation as well as the unnecessary removal of excess liquid from the shaped article after the treatment. In this case, the pressure of the contacting gas containing the halogen or halogen compound is preferably at least 10 Torr in order to obtain a sufficiently high efficiency of the treatment. The time for the halogen treatment is usually from several tens of seconds to several tens of minutes although the time is largely dependent on the pressure and temperature of the contacting gas, temperature of the surface of the shaped article and other parameters.

When a shaped article of a resin is treated according to the above described method of the present invention, the surface properties of the shaped article can be remarkably improved without affecting the properties inherent to the shaped article such as mechanical strengths whereby the surface is imparted with excellent anti-static effect and resistance against stain by the deposition of dusts and dirts along with the improvements in respect of abrasion resistance, surface hardness, acceptability of adhesives, wettability, printability and the like surface properties.

In the following, examples are given to illustrate the method of the invention in further detail.

Three kinds of sheets each having a thickness of 0.5 mm were prepared with a PVC resin as the main component in the examples described below (hereinafter called resin sheets A, B and C). Following are the formulations for these resin sheets, in which the amount of each of the components taken in parts by weight is shown simply by parts.

Sheet A: A resin compound composed of 100 parts of a homopolymeric PVC resin, 5 parts of dioctyl phthalate, 3 parts of dibutyltin mercaptide and 1 part of epoxidated soybean oil was kneaded for 10 minutes in a hot roller mill at 170° C. and shaped into a sheet by compression molding at 175° C.

Sheet B: A resin compound composed of 100 parts of a homopolymeric PVC resin, 3 parts of lead stearate, 0.5 part of barium stearate and 0.5 part of stearic acid was kneaded for 10 minutes in a hot roller mill at 180° C. and shaped into a sheet by compression molding at 185° C.

Sheet C: A resin compound composed of a copolymeric resin of vinyl chloride and vinyl acetate (SC-400G, a product by Shin-Etsu Chemical Co., Japan), 3 parts of dibutyltin mercaptide, 2 parts of epoxidated soybean oil and 0.5 part of calcium stearate was kneaded for 10 minutes in a hot roller mill at 180° C. and shaped into a sheet by compression molding at 185° C.

After the plasma treatment and, optionally, subsequent halogen treatment, the improvement in the surface properties of the resin sheets in respect of the anti-static effect was evaluated by the measurements in three ways. Firstly, the surface of the resin sheet was rubbed 10 times with a dry cotton cloth to induce static electricity and the thus rubbed surface was immediately brought near to a pile of cigarette ash to determine the largest distance therebetween at which the cigarette ash was attracted to the surface of the resin sheet in an atmosphere of 60% relative humidity at 25° C. Secondly, the surface resistivity of the resin sheet was determined. Thirdly, the voltage of the static electricity accumulated when the surface of the resin sheet was rubbed with a cotton cloth for 30 seconds was determined by use of a rotary static tester at 750 r.p.m. under a load of 200 g.

EXAMPLE 1

The sheet A was placed in the plasma chamber of an apparatus for plasma generation and, after evacuation to a pressure of $10^{-5}$ Torr, the chamber was filled with argon gas and kept at a pressure of 0.4 Torr with constant flow of the gas. Then, vapor of vinyl trimethoxysilane was introduced into the chamber and the atmosphere inside the chamber was controlled and maintained to have a partial pressures of the argon gas as the diluent gas and the silane compound equal to 0.4 Torr and 0.4 Torr, respectively, with continuous flow of the gases. Low temperature plasma was generated for 1 minute in this atmosphere by the application of 2 kilowatts of high frequency electric power at a frequency of 13.56 MHz to have the surface of the resin sheet exposed to the low temperature plasma.

After the end of the above plasma treatment, the plasma chamber was evacuated to a pressure of $10^{-5}$ Torr and then filled with chlorine gas up to a pressure of 400 Torr so as to have the surface of the plasma-treated resin sheet contacted with the chlorine gas for 5 minutes at this pressure.

The results of the measurements undertaken with this treated resin sheet and the same resin sheet before the treatment are shown in Table 1 below.

EXAMPLE 2

The sheet A was subjected to the plasma treatment in about the same manner as in Example 1 except that the argon gas as the diluent gas was not introduced into the plasma chamber and the organic silicon compound was vinyl methyl dimethoxysilane instead of vinyl trimethoxysilane introduced into the plasma chamber evacuated in advance to a pressure of 0.005 Torr as a result of balancing with leakage of air to give a pressure of 0.01 Torr of the silane compound with continuous flow of the silane vapor. The plasma treatment of the resin sheet was effected for 2 minutes by the application of 1 kilowatt of high frequency electric power at 13.56 MHz.

The halogen treatment of the plasma-treated resin sheet was carried out in a separate vacuum-tight vessel which was evacuated to a pressure of 1 Torr and then filled with chlorine gas with which the plasma-treated resin sheet was contacted for 5 minutes at a pressure of 100 Torr.

The results of the measurements undertaken with this resin sheet are shown in Table 1 below.

EXAMPLE 3

The conditions of the plasma treatment of the resin sheet A were substantially the same as in Example 1 except that no argon gas was introduced into the plasma chamber and the pressure of vinyl trimethexysilane was increased to 1 Torr. The electric power of the plasma discharge was decreased to 1 kilowatt.

The halogen treatment of the plasma-treated resin sheet was carried out in a separate vessel which was, after evacuation to a pressure of $10^{-2}$ Torr, filled with chlorine gas with which the plasma-treated resin sheet was contacted for 5 minutes at a pressure of 400 Torr.

The results of the measurements are shown in Table 1 below.

EXAMPLE 4

The experimental procedure in Example 3 was repeated with the omission of the halogen treatment.

The results of the measurements are shown in Table 1.

EXAMPLES 5 AND 6

The resin sheet A was placed in the plasma chamber of the apparatus for plasma generation, which was evacuated to a pressure of $10^{-5}$ Torr blancing with the leakage of the atmospheric air and then filled with nitrogen gas to a pressure of 0.05 Torr with continuous gas flow.

In the next place, vapor of methyl dichlorosilane was introduced into the plasma chamber to be mixed with the nitrogen gas and low temperature plasma was generated therein by the application of 2 kilowatts of high frequency electric power at 13.56 MHz for 1 minute (Example 5) or 2 minutes (Example 6) while the gaseous atmosphere was controlled and maintained to have partial pressures of the nitrogen gas and the silane vapor at 0.05 Torr and 0.1 Torr, respectively, with continuous flow of the gases.

The plasma-treated resin sheet was subjected to the measurements either as such (Example 5) or after halogen treatment (Example 6), which was conducted by first evacuating the plasma chamber to a pressure of $10^{-5}$ Torr followed by the introduction of hydrogen chloride gas to a pressure of 50 Torr, this pressure being maintained for 10 minutes thereby to have the resin sheet contacted with the hydrogen chloride gas.

The results of the mesurements undertaken with these resin sheets are shown in Table 1 below.

EXAMPLE 7 AND 8

The same experimental procedure as in Example 6 was repeated excepting that the methyl dichlorosilane in Example 6 was replaced with dimethyl chlorosilane (Example 7) or trimethylsilane (Example 8).

EXAMPLE 9

The resin sheet B was placed in the plasma chamber which was evacuated to a pressure of 0.2 Torr balancing with leakage of the atmospheric air and then filled with vapor of N-(2-aminoethyl)-3-aminopropyl methyl dimethoxysilane to be mixed with the air and low temperature plasma was generated in the plasma chamber by the application of 10 kilowatts of high frequency electric power at 110 kHz for 30 seconds to expose the surface of the resin sheet to the plasma while the gaseous atmosphere was controlled and maintained to have partial pressures of the air and the silane vapor at 0.2 Torr and 0.4 Torr, respectively.

TABLE 1

| | Example No. | Not treated | 1 | 2 | 3 | 4 | 5 | 6 | 7 | 8 |
|---|---|---|---|---|---|---|---|---|---|---|
| Diluent gas | Gas | — | Agron | Air | — | — | Nitrogen | Nitrogen | Nitrogen | Nitrogen |
| | Pressure, Torr | — | 0.4 | 0.005 | — | — | 0.05 | 0.05 | 0.05 | 0.05 |
| Organic silicon compound | Compound | — | (a) | (b) | (a) | (a) | (c) | (c) | (d) | (e) |
| | Pressure, Torr | — | 0.4 | 0.005 | 1 | 1 | 0.1 | 0.1 | 0.1 | 0.1 |
| Plasma generation | Frequency, MHz | — | 13.56 | 13.56 | 13.56 | 13.56 | 13.56 | 13.56 | 13.56 | 13.56 |
| | Power, kW | — | 2 | 1 | 1 | 1 | 2 | 2 | 2 | 2 |
| | Time, minutes | — | 1 | 2 | 1 | 1 | 1 | 2 | 1 | 2 |
| Halogen treatment | Compound | — | $Cl_2$ | $Cl_2$ | $Cl_2$ | — | — | HCl | HCl | HCl |
| | Pressure, Torr | — | 400 | 100* | 400 | — | — | 50 | 50 | 50 |
| | Time, minutes | — | 5 | 5 | 5 | — | — | 10 | 10 | 10 |
| Distance of cigarette ash attraction, cm | | 6 | 0 | 0 | 1 | 3 | 1 | 0 | 1 | 2 |
| Surface resistivity, ohm | | $8 \times 10^{15}$ | $<10^{10}$ | $<10^{10}$ | $3 \times 10^{11}$ | $5 \times 10^{12}$ | $7 \times 10^{12}$ | $<10^{10}$ | $8 \times 10^{10}$ | $5 \times 10^{11}$ |
| Charge voltage by rubbing, volts | | 6900 | 400 | 600 | 1500 | 2300 | 2500 | 800 | 1200 | 1800 |

Organic silicon compound:
(a) vinyl trimethoxysilane
(b) vinyl methyl dimethoxysilane
(c) methyl dichlorosilane
(d) dimethyl chlorosilane
(e) trimethylsilane
*1 Torr of air contained Thereafter, the plasma chamber was evacuated to a pressure of $10^{-5}$ Torr and then filled with hydrogen bromide gas to a pressure of 700 Torr whereby the surface of the plasma-treated resin sheet was kept in contact with the hydrogen bromide gas at this pressure for 10 minutes.

The results of the measurements undertaken with this treated resin sheet as well as the resin sheet B before treatment are shown in Table 2 below.

EXAMPLES 10 AND 11

The resin sheet B was placed in the plasma chamber, which was evacuated to a pressure of $10^{-5}$ Torr and then filled with nitric oxide gas to a pressure of 0.1 Torr, this pressure being maintained with continuous gas flow.

In the next place, the vapor of 3-methacryloxypropyl trimethoxysilane was introduced into the plasma chamber to be mixed with the nitric oxide gas and low temperature plasma was generated in the chamber by the application of 5 kilowatts of high frequency electric power at 110 kHz for 1 minute whereby the surface of the resin sheet was exposed to the low temperature plasma while the gaseous atmosphere was controlled and maintained to have partial pressures of the nitric oxide gas and the silane vapor at 0.1 Torr and 0.0008 Torr (Example 10) or 0.008 Torr (Example 11), respectively, with continuous flow of the gases.

After the end of the above plasma treatment, the introduction of the nitric oxide gas and the silane vapor was stopped followed by the introduction of a very small volume of air to a pressure of 10 Torr and then of the vapor of allyl chloride to a pressure of 400 Torr so as to have the surface of the plasma-treated resin sheet in contact with the vapor of allyl chloride for 15 minutes with the pressure maintained at 400 Torr.

The results of the measurements undertaken with these sheets are shown in Table 2 below.

EXAMPLES 12 AND 13

The resin sheet C was placed in the plasma chamber, which was evacuated to a pressure of 1 Torr balancing with the leakage of the atmospheric air and then filled with the vapor of hexamethyldisiloxane (Example 12) or divinyl tetramethyldisiloxane (Example 13) to be mixed with the air and low temperature plasma was generated in the plasma chamber by the application of 2 kilowatts of high frequency electric power at 13.56 MHz whereby the surface of the resin sheet was exposed to the low temperature plasma for 2 minutes while the gaseous atmosphere was controlled and maintained to have partial pressures of the air and the siloxane vapor at 1 Torr and 2 Torr, respectively, with continuous flow of the gases.

Thereafter, introduction of the siloxane vapor was stopped and chlorine gas was introduced into the chamber up to a pressure of 400 Torr either directly (Example 12) or after introduction of air to a pressure of 50 Torr (Example 13) so as to have the surface of the plasma-treated resin sheet in contact with the chlorine gas for 5 minutes with the pressure of the chlorine gas maintained at 400 Torr.

TABLE 2

| Example No. | | Not treated | PVC resin sheet B | | |
|---|---|---|---|---|---|
| | | | 9 | 10 | 11 |
| Diluent gas | Gas | — | Air | NO | NO |
| | Pressure, Torr | — | 0.2 | 0.1 | 0.1 |
| Organic silicon compound | Compound | — | (f) | (g) | (g) |
| | Pressure, Torr | — | 0.4 | 0.0008 | 0.008 |
| Plasma generation | Frequency, MHz | — | 0.11 | 0.11 | 0.11 |
| | Power, kW | — | 10 | 5 | 5 |
| | Time, minutes | — | 0.5 | 1 | 1 |
| Halogen treatment | Compound | — | HBr | Allyl chloride | Allyl chloride |
| | Pressure, Torr | — | 700 | 400* | 400* |
| | Time, minutes | — | 10 | 15 | 15 |
| Distance of cigarette ash attraction, cm | | 6 | 0 | 6 | 0 |
| Surface resistivity, ohm | | $7 \times 10^{15}$ | $<10^{10}$ | $4 \times 10^{15}$ | $<10^{10}$ |
| Charge voltage by rubbing, volts | | 6900 | 800 | 6100 | 700 |

Organic silicon compound:
(f) N—(2-aminoethyl)-3-aminopropyl methyl dimethoxysilane
(g) 3-methacryloxypropyl trimethoxysilane
*10 Torr of air contained The results of the measurements undertaken with these sheets as well as the resin sheet C before treatment are shown in Table 3 below.

EXAMPLES 14 AND 15

The resin sheet C was placed in the plasma chamber, which was evacuated to a pressure of $10^{-5}$ Torr and then filled with argon gas to a pressure of 0.5 Torr. Thereafter, vapor of tetramethylsilane (Example 14) or trimethyl chlorosilane (Example 15) was introduced into the chamber to be mixed with the argon gas and low temperature plasma was generated in the chamber by the application of 1 kilowatt of high frequency electric power at 13.56 MHz whereby the surface of the resin sheet was exposed to the low temperature plasma for 2 minutes while the gaseous atmosphere was controlled and maintained to have partial pressures of the argon gas and the silane vapor at 0.5 Torr and 0.05 Torr, respectively, with continuous flow of the gases.

The plasma-treated resin sheet taken out of the plasma chamber was put into another vessel, which was evacuated to a pressure of 100 Torr and then filled with chlorine gas to a pressure of 400 Torr so as to have the surface of the resin sheet in contact with the chlorine gas for 5 minutes with the pressure of the atmosphere kept at 400 Torr above.

The results of the measurements undertaken with these resin sheets are shown in Table 3 below.

TABLE 3

| Example No. | | Not treated | PVC resin sheet C | | | |
|---|---|---|---|---|---|---|
| | | | 12 | 13 | 14 | 15 |
| Diluent gas | Gas | — | Air | Air | Argon | Argon |
| | Pressure, Torr | — | 1 | 1 | 0.5 | 0.5 |
| Organic silicon compound | Compound | — | (h) | (i) | (j) | (k) |
| | Pressure, Torr | — | 2 | 2 | 0.05 | 0.05 |
| Plasma generation | Frequency, MHz | — | 13.56 | 13.56 | 13.56 | 13.56 |
| | Power, kW | — | 2 | 2 | 1 | 1 |
| | Time, minutes | — | 2 | 2 | 2 | 2 |
| Halogen treatment | Compound | — | $Cl_2$ | $Cl_2$ | $Cl_2$ | $Cl_2$ |
| | Pressure, Torr | — | 400 | 400* | 400** | 400** |
| | Time, minutes | — | 5 | 5 | 5 | 5 |
| Distance of cigarette ash attraction, cm | | 6 | 3 | 0 | 3 | 0 |

TABLE 3-continued

| | PVC resin sheet C | | | | |
|---|---|---|---|---|---|
| Example No. | Not treated | 12 | 13 | 14 | 15 |
| Surface resistivity, ohm | $6 \times 10^{15}$ | $6 \times 10^{13}$ | $<10^{10}$ | $9 \times 10^{13}$ | $<10^{10}$ |
| Charge voltage by rubbing, volts | 7100 | 3900 | 600 | 4200 | 400 |

Organic silicon compound:
(h) hexamethyldisiloxane
(i) divinyl tetramethyldisiloxane
(j) tetramethylsilane
(k) trimethyl chlorosilane
*50 Torr of air contained
**100 Torr of air contained

EXAMPLES 16 TO 25

Films, sheets or plates of five kinds of synthetic resins including a polyester, i.e. polyethylene terephthalate resin (Examples 16 and 17), fluorocarbon polymer, i.e. polytetrafluoroethylene resin (Examples 18 and 19), low-density polyethylene (Examples 20 and 21), polysulfone resin, i.e. polycondesation product of 4,4'-dichlorodiphenylsulfone and sodium salt of bis-phenol A (Examples 22 and 23) and polystyrene (Examples 24 and 25), each being a commercially available product used as such, were subjected to the plasma treatment in a gaseous atmosphere of an organic silicon compound alone or as diluted with an inorganic diluent gas followed, in Examples 17, 19, 21, 23 and 25 only, by the halogen treatment in a manner similar to the preceding examples.

Following Tables 4 and 5 summarize the kinds of the diluent gas and the organic silicon compound and partial pressures thereof in the plasma atmosphere, the conditions of the plasma generation and the conditions of the halogen treatment as well as the results of the measurements undertaken with each of the thus treated synthetic resin samples together with the results of the measurements undertaken with the same synthetic resin samples before treatment.

TABLE 4

| | | Resin | | | | | | | | |
|---|---|---|---|---|---|---|---|---|---|---|
| | | Polyester | | | Fluorocarbon | | | Polyethylene | | |
| Example No. | | Not treated | 16 | 17 | Not treated | 18 | 19 | Not treated | 20 | 21 |
| Diluent gas | Gas | — | Air | Air | — | Air | Air | — | Argon | Argon |
| | Pressure, Torr | — | 0.1 | 0.1 | — | 0.1 | 0.1 | — | 0.2 | 0.2 |
| Organic silicon compound | Compound | — | (k) | (k) | — | (l) | (l) | — | (h) | (h) |
| | Pressure, Torr | — | 0.2 | 0.2 | — | 0.5 | 0.5 | — | 0.1 | 0.1 |
| Plasma generation | Frequency, MHz | — | 13.56 | 13.56 | — | 13.56 | 13.56 | — | 0.11 | 0.11 |
| | Power, kW | — | 2 | 2 | — | 3 | 3 | — | 4 | 4 |
| | Time, minutes | — | 1 | 1 | — | 1 | 1 | — | 2 | 2 |
| Halogen treatment | Compound | — | — | $Cl_2$ | — | — | $Cl_2$ | — | — | $I_2$ |
| | Pressure, Torr | — | — | 50 | — | — | 100* | — | — | 10** |
| | Time, minutes | — | — | 5 | — | — | 5 | — | — | 3 |
| Distance of cigarette ash attraction, cm | | 5 | 0 | 0 | 7 | 0 | 0 | 6 | 2 | 1 |
| Surface resistivity, ohm | | $7 \times 10^{13}$ | $<10^{10}$ | $<10^{10}$ | $7 \times 10^{15}$ | $<10^{10}$ | $<10^{10}$ | $3 \times 10^{14}$ | $9 \times 10^{11}$ | $7 \times 10^{10}$ |
| Charge voltage by rubbing, volts | | 2500 | 200 | 120 | 7100 | 400 | 250 | 5100 | 1100 | 700 |

Organic silicon compound:
(k), (h) see footnote for Table 3
(l) chloromethyl dimethyl chlorosilane
*10 Torr of air contained
**1 Torr of air contained

TABLE 5

| | | Resin | | | | | |
|---|---|---|---|---|---|---|---|
| | | Polysulfone | | | Polystyrene | | |
| Example No. | | Not treated | 22 | 23 | Not treated | 24 | 25 |
| Diluent gas | Gas | — | Argon | Argon | — | — | — |
| | Pressure, Torr | — | 0.05 | 0.05 | — | — | — |
| Organic silicon compound | Compound | — | (m) | (m) | — | (n) | (n) |
| | Pressure, Torr | — | 0.05 | 0.05 | — | 0.3 | 0.3 |
| Plasma generation | Frequency, MHz | — | 0.11 | 0.11 | — | 13.56 | 13.56 |
| | Power, kW | — | 4 | 4 | — | 1 | 1 |
| | Time, minutes | — | 1 | 1 | — | 4 | 4 |
| Halogen treatment | Compound | — | — | $Br_2$ | — | — | HCl |
| | Pressure, Torr | — | — | 110* | — | — | 10 |
| | Time, minutes | — | — | 10 | — | — | 20 |
| Distance of cigarette ash attraction, cm | | 5 | 0 | 0 | 6 | 3 | 2 |
| Surface resistivity, ohm | | $3 \times 10^{13}$ | $<10^{10}$ | $<10^{10}$ | $1 \times 10^{14}$ | $2 \times 10^{12}$ | $8 \times 10^{11}$ |
| Charge voltage by rubbing, volts | | 1600 | 90 | 60 | 3100 | 1900 | 950 |

TABLE 5-continued

|  | Resin | | | | | |
|---|---|---|---|---|---|---|
|  | Polysulfone | | | Polystyrene | | |
| Example No. | Not treated | 22 | 23 | Not treated | 24 | 25 |
| volts | | | | | | |

Organic silicon compound:
(m) methyl trichlorosilane
(n) trimethoxysilane
*100 Torr of air contained

What is claimed is:

1. A method for modifying the surface properties of a shaped article of a synthetic resin which comprises exposing the surface of the shaped article to a low temperature plasma generated in a gaseous atmosphere containing the vapor of an organic silicon compound at a pressure in the range from 0.001 Torr to 10 Torr and then contacting the surface with a halogen or a halogen compound selected from the class consisting of hydrogen halides and organic halogen compounds.

2. The method as claimed in claim 1 wherein the organic silicon compound is diluted with a diluent gas selected from the class consisting of nitrogen, inorganic nitrogen-containing compounds and rare gases so that the gaseous atmosphere has a partial pressure of the organic silicon compound and a partial pressure of the diluent gas in the range from 0.0001 Torr to 10 Torr and in the range from 0.0001 Torr to 10 Torr, respectively.

3. The method as claimed in claim 1 wherein the organic silicon compound is a compound having at least one functional atom or group bonded to the silicon atom directly or through a divalent hydrocarbon group.

4. The method as claimed in claim 3 wherein the functional atom directly bonded to the silicon atom is a hydrogen atom or a halogen atom.

5. The method as claimed in claim 3 wherein the functional group directly bonded to the silicon atom is selected from the class consisting of a hydroxy group, alkoxy group, acyloxy group, alkenyl group and alkynyl group.

6. The method as claimed in claim 3 wherein the functional group bonded to the silicon atom through a divalent hydrocarbon group is selected from the class consisting of an amino group, methacryloxy group, mercapto group and epoxy group.

7. The method as claimed in claim 3 wherein the organic silicon compound has at least two functional atoms or groups bonded to the silicon atom or atoms each directly or through a divalent hydrocarbon group.

8. The method as claimed in claim 2 wherein the inorganic nitrogen-containing compound is selected from the class consisting of nitric oxide, nitrogen dioxide and ammonia.

9. The method as claimed in claim 1 wherein the organic halogen compound is selected from the class consisting of n-propyl fluoride, methyl chloride, methyl bromide, allyl chloride, vinyl chloride, vinyl bromide, isopropenyl chloride, 1,1,2-trifluoroethane, 1,1-dichloroethane, chloroform and carbon tetrachloride.

10. The method as claimed in claim 1 wherein the surface of the shaped article of the synthetic resin is contacted with the halogen or halogen compound in a gaseous phase.

11. The method as claimed in claim 10 wherein the halogen or halogen compound in the gaseous phase has a pressure of at least 10 Torr.

* * * * *